United States Patent
Fujihara et al.

(10) Patent No.: US 6,852,826 B2
(45) Date of Patent: Feb. 8, 2005

(54) MANUFACTURING METHOD OF POLYAMIC ACID, AND POLYAMIC ACID SOLUTION

(75) Inventors: Kan Fujihara, Otsu (JP); Kazuhiro Ono, Otsu (JP); Kiyokazu Akahori, Otsu (JP)

(73) Assignee: Kanera Corporation, Osaka (JP)

( * ) Notice: Subject to any disclaimer, the term of this patent is extended or adjusted under 35 U.S.C. 154(b) by 0 days.

(21) Appl. No.: 10/326,799

(22) Filed: Dec. 19, 2002

(65) Prior Publication Data

US 2003/0144461 A1 Jul. 31, 2003

(30) Foreign Application Priority Data

Dec. 21, 2001 (JP) .................................... 2001-390675
Jul. 29, 2002 (JP) .................................... 2002-220226

(51) Int. Cl.[7] ........................ C08G 73/10; C08G 69/28
(52) U.S. Cl. ...................... 528/170; 528/125; 528/126; 528/128; 528/172; 528/173; 528/176; 528/179; 528/183; 528/188; 528/220; 528/229; 528/350; 528/351; 528/353
(58) Field of Search ................................ 528/125, 126, 528/128, 170, 172, 173, 176, 179, 183, 188, 220, 229, 350, 351, 353; 522/420, 422

(56) References Cited

U.S. PATENT DOCUMENTS

| | | | | |
|---|---|---|---|---|
| 5,668,247 A | * | 5/1987 | Furutani et al. | 528/353 |
| 4,835,249 A | * | 5/1989 | Gallagher et al. | 528/353 |
| 5,026,822 A | * | 6/1991 | Vora | 528/353 |
| 5,049,649 A | * | 9/1991 | Rohitkumar | 528/353 |
| 5,055,116 A | * | 10/1991 | Kohn et al. | 95/47 |
| 5,210,174 A | * | 5/1993 | Tamai et al. | 528/353 |
| 5,302,652 A | * | 4/1994 | Parish | 524/424 |
| 5,478,917 A | * | 12/1995 | Blum et al. | 528/353 |
| 6,307,002 B1 | * | 10/2001 | Okada et al. | 528/170 |
| 6,333,391 B1 | * | 12/2001 | Laycock et al. | 528/170 |
| 6,335,416 B1 | * | 1/2002 | Nojiri et al. | 528/170 |
| 6,350,845 B1 | * | 2/2002 | Okada et al. | 528/170 |
| 6,451,955 B1 | * | 9/2002 | Hausladen et al. | 528/170 |
| 6,469,126 B1 | * | 10/2002 | Auman et al. | 528/170 |
| 6,476,177 B2 | * | 11/2002 | Auman et al. | 528/170 |
| 2002/0188088 A1 | * | 12/2002 | Hausladen et al. | 528/10 |
| 2003/0144461 A1 | * | 7/2003 | Fujihara et al. | 528/288 |

FOREIGN PATENT DOCUMENTS

JP 11-228715 8/1999
JP 2002-114848 4/2002

* cited by examiner

Primary Examiner—P. Hampton Hightower
(74) Attorney, Agent, or Firm—Hogan & Hartson LLP

(57) ABSTRACT

In a step of polymerizing polyamic acid by mixing tetracarboxylic acid dianhydride and diamine and polycondensating the tetracarboxylic acid dianhydride and diamine under the presence of a polymerization-use solvent, a tetracarboxylic acid dianhydride slurry in which a tetracarboxylic acid dianhydride is dispersed in a dispersion medium is used. According to this, it is possible to directly manufacture a polyamic acid solution having a high concentration of polyamic acid more than or equal to 10% by weight. Especially, even if a tetracarboxylic acid dianhydride having low solubility in the polymerization-use solvent, it is possible to effectively manufacture a polyamic acid solution having high solids content, by a simple process and in a short time.

17 Claims, No Drawings

MANUFACTURING METHOD OF POLYAMIC ACID, AND POLYAMIC ACID SOLUTION

FIELD OF THE INVENTION

The present invention relates to a manufacturing method of polyamic acid, which is a raw material of a polyimide resin, and a polyamic acid solution (polyamic-acid) obtained by using the manufacturing method, and especially to a manufacturing method capable of manufacturing, efficiently in a short time, the polyamic acid solution having a high solids content, and to the polyamic acid solution.

BACKGROUND OF THE INVENTION

A polyimide resin, which has excellent characteristics in heat resistance and electrical insulation property, is used in various field these days.

The polyimide resin is manufactured from polyamic acid as a raw material. The polyamic acid is produced, in general, by reacting a tetracarboxylic acid dianhydride and diamine under a presence of a solvent. Specifically, adopted for this purpose is, for example, a method of adding in advance the tetracarboxylic acid dianhydride and diamine in a reaction vessel, and then adding a solvent (hereinafter, referred to as a polymerization-use solvent) therein so as to polymerize the tetracarboxylic acid dianhydride and diamine. Thus, in the thus obtained polyamic acid solution, the polymerization-use solvent is utilized as a solvent (hereinafter, referred to as a solution-use solvent) for dissolving polyamic acid.

However, abrupt polymerization reaction takes place before the tetracarboxylic acid dianhydride and diamine are evenly dissolved in the polymerization-use solvent in the above-described method, because the tetracarboxylic acid dianhydride and diamine are added therein in advance. This may cause such a problem in a reaction system of the polymerization that viscosity of part of the reaction system is increased (hereinafter, this problem is referred to as partial viscosity increase). The partial viscosity increase may, in a worst case, result in formation of solid block in the part of the reaction system. As described above, such abrupt polymerization reaction tends to cause "uneven polymerization", which causes such a problem that every polymerization reaction produces a reaction product (polyamic acid solution) of a different property, whereby the polyimide resin produced from the polyamic acid solution as a raw material has uneven property.

In view of this, various methods have been adopted, for example, a method disclosed in Japanese Publication of Unexamined Patent Application, "Tokukaihei, No. 7-324134" (published on Dec. 12, 1995), Paragraphs [0039] to [0042], in which powder or a solution of the tetracarboxylic acid dianhydride is gradually added into a diamine solution or a diamine suspension, and a method disclosed in Japanese Publication of Unexamined Patent Application, "Tokukaihei, No. 6-336475" (published on Dec. 6, 1994), Paragraph [0025], in which powder or a solution of diamine is gradually added into a solution of the tetracarboxylic acid dianhydride, contrary to the above-mentioned method. Use of those methods makes it possible to avoid the abrupt polymerization reaction. Here, it should be noted that a solvent used for preparing the solution of the tetracarboxylic acid dianhydride and diamine is referred to as a mixing-use solvent.

Incidentally, in most cases, a polyamic acid solution having a high solids content, in other words, a polyamic acid solution having a high concentration of polyamic acid is used in order to form a formed product of a polyimide resin such as a polyimide film. In manufacturing the formed product of the polyimide resin, unnecessary solvent is removed and burned out or is recollected and recycled after imidification of the polyamic acid. Thus, a high solids content and low solvent content in the polyamic acid solution attain low cost in removal/recollection of the solvent, thereby avoiding in an increase in manufacturing cost of the formed product of the polyimide resin.

However, the foregoing prior arts are not only incapable of improving productivity of the polyimide acid, but also unable to suppress the increase in the manufacturing cost of the formed product of the polyimide resin.

Specifically, in the method in which the tetracarboxylic acid dianhydride solution is mixed into diamine for polymerization of the polyamic acid, it is necessary to dissolve the tetracarboxylic acid dianhydride in the mixing-use solvent. On the other hand, in the method in which the powder of the tetracarboxylic acid dianhydride is mixed into the diamine solution, it is necessary to dissolve the tetracarboxylic acid dianhydride in the mixing-use solvent in which the diamine is dissolved. The mixing-use solvent is identical to the polymerization-use solvent, and is in general suitably a non-protic solvent, and especially an amide polarity organic solvent. In short, the tetracarboxylic acid dianhydride should be soluble in the polymerization-use solvent.

However, compounds having poor solubility in the polymerization-use solvent, are recently used as the tetracarboxylic acid dianhydride in many cases, because there is a wide variety of structures of the tetracarboxylic acid dianhydride for use in manufacturing polyamic acid.

Thus, in the method in which diamine is gradually added in the tetracarboxylic acid dianhydride solution, low solubility of the tetracarboxylic acid dianhydride in the mixing-use solvent (polymerization-use solvent) leads to necessity of a large quantity of the mixing-use solvent in order to prepare the tetracarboxylic acid dianhydride solution. This lowers concentration of the tetracarboxylic acid dianhydride in the tetracarboxylic acid dianhydride solution, thus lowering the solids content in the resultant polyamic acid solution. As a result, it becomes difficult to attain the low cost in the removal/recollection of the solvent in manufacturing the formed product of the polyimide resin, as described above.

Because of this, the method in which the powder of the tetracarboxylic acid dianhydride is gradually added in the diamine solution is more popularly applied for the polymerization of the polyamic acid. However, even in this method, it is requisite that the tetracarboxylic acid dianhydride have solubility high enough to be dissolved, without difficulty, (that is, the tetracarboxylic acid dianhydride is sufficiently soluble) in the polymerization-use solvent in which diamine is dissolved. In short, if the tetracarboxylic acid dianhydride has poor solubility in the polymerization-use solvent, the polymerization of the polyamic acid takes longer time, thus lowering the productivity.

SUMMARY OF THE INVENTION

The present invention, contrived in view of the problems, has an object of providing a manufacturing method capable of manufacturing a polyamic acid solution having a high solids content by a simple process efficiently in a short time, especially even if a tetracarboxylic acid dianhydride having low solubility in the polymerization-use solvent, and an polyamic acid solution having a high solids contents, obtained by using the method.

As a result of intensive studies in view of the problems, the inventors of the present invention found out that, in case a tetracarboxylic acid dianhydride having low solubility in an organic solvent for use in polymerization of polyamic acid solution is used, it is possible to efficiently produce an polyamic acid solution having a high concentration by mixing diamine and a slurry of the tetracarboxylic acid dianhydride, thereby accomplishing the present invention.

Specifically, a manufacturing method of polyamic acid, of the present invention includes the step of polymerizing polyamic acid by mixing a tetracarboxylic acid dianhydride and diamine, and polycondensating the tetracarboxylic acid dianhydride and diamine under a presence of a polymerization-use solvent, wherein the tetracarboxylic acid dianhydride is mixed as a tetracarboxylic acid dianhydride slurry prepared by dispersing the tetracarboxylic acid dianhydride in a dispersion medium.

The manufacturing method may be so arranged that diamine is in a form of a diamine solution in which diamine is dissolved in the polymerization-use solvent, or that diamine is in form of powder. Moreover, it is preferable in the manufacturing method that the dispersion medium is a solvent applicable as the polymerization-use solvent.

Furthermore, it is preferable in the manufacturing method that the tetracarboxylic acid dianhydride has a solubility index Ns of 5 or less when the slurry has a temperature of 25° C., the solubility index Ns being specified by an equation:

$$Ns = Wa/(Wa+Ws) \times 100,$$

where Wa is saturated dissolution weight of the tetracarboxylic acid dianhydride in the dispersion medium, and Ws is weight of the dispersion medium.

According to the manufacturing method, it is possible to perform solid-liquid reaction between the tetracarboxylic acid dianhydride slurry and the diamine solution by using the tetracarboxylic acid dianhydride slurry, so as to polymerize components thereof. Therefore, even if the tetracarboxylic acid dianhydride has low solubility in the polymerization-use solvent, it is possible to directly and effectively manufacture a polyamic acid solution having a high solids content, by a simple process and in a short time. Further, this method causes almost no "uneven polymerization" in polymerizing polyamic acid, thus stabilizing the viscosity of the resultant polyamic acid solution. Thus, it is possible to manufacture polyamic acid of high quality without increase in cost.

Moreover, a polyamic acid solution of the present invention can be realized by containing polyamic acid manufactured by the manufacturing method of polyamic acid, but the polyamic acid solution of the present invention may contain polyamic acid of 10% by weight or more, the polyamide being directly manufactured by the manufacturing method.

With the above arrangement, it is possible to produce a high-quality polyamic acid solution having a high concentration with high efficiency. Thus, by using the polyamic acid solution, it is possible to manufacture polyimide of high quality at low cost without increase in cost.

For a fuller understanding of the nature and advantages of the invention, reference should be made to the ensuing detailed description.

DESCRIPTION OF THE EMBODIMENTS

The following will explain an embodiment of the present invention, but is not to limit the present invention.

A manufacturing method of polyamic acid of the present invention includes the steps of mixing diamine and a tetracarboxylic acid dianhydride so as to prepare a mixture thereof, and polycondensating the mixture so as to polymerize polyamic acid, wherein a tetracarboxylic acid dianhydride slurry in which the tetracarboxylic acid dianhydride is dispersed, has been prepared in advance, and the tetracarboxylic acid dianhydride slurry is mixed with diamine.

Moreover, a polyamic acid solution of the present invention is obtained by the above manufacturing method and has a high solids content. By using the polyamic acid solution, it is possible to manufacture a formed product of a polyimide resin with ease and at low cost.

The tetracarboxylic acid dianhydride used in the present invention has a structure including two dicarboxylic acid anhydrides, as represented by the following general formula (1):

General Formula (1)

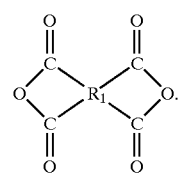

$R_1$ in General Formula (1) is preferably a tetravalent aromatic residual group including at least one six-member ring consisting of six carbon atoms, and more preferably an aromatic residual group selected from the group consisting of four types of aromatic residual groups represented by the following General Formulas (2):

General Formula (2)

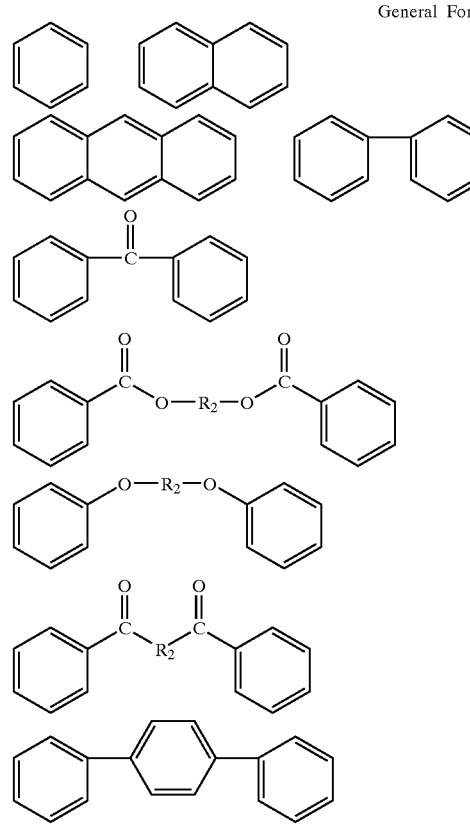

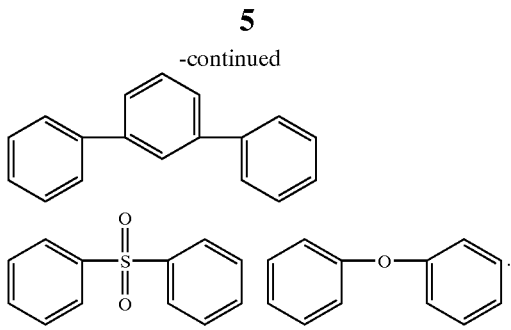

Note that there is no particular limitation in structural positions of tetravalency of the aromatic residual groups of General Formula (2). In General Formula (2), for easy explanation, lines of bonding indicating valency are not shown. However, it is preferable that the structure have two pairs of valencies located in corresponding positions in the rings (that is, each ring has two valency in identical positions).

Moreover, $R_2$ in General Formula (2) is preferably a divalent organic group including a benzene ring or naphthalene ring, the divalent organic group being selected from the group consisting of compounds represented by the following General Formulas (3):

General Formula (3)

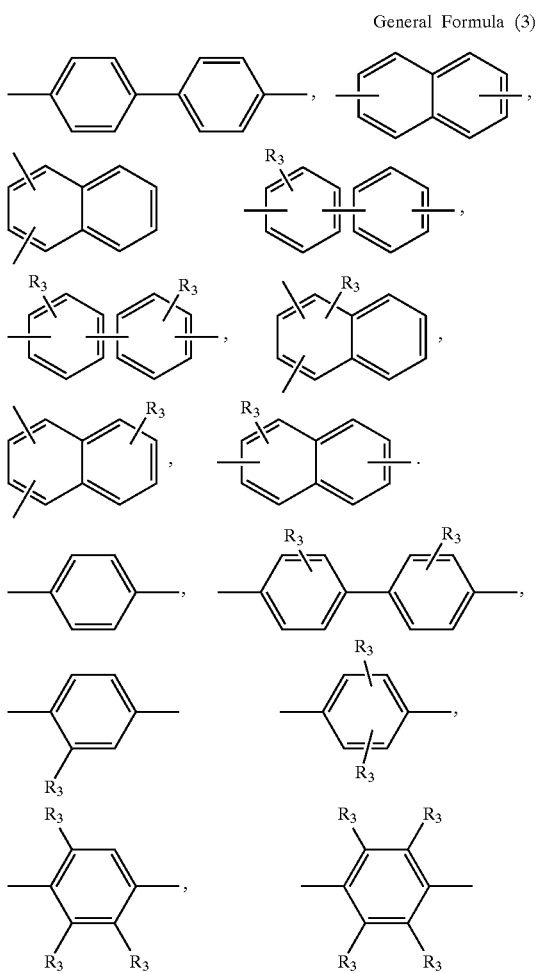

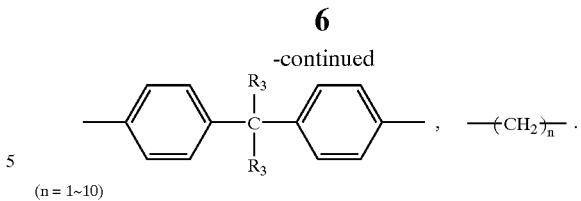

(n = 1~10)

Note that $R_3$ in General Formula (3) is a substituent selected from the group consisting of H—, $CH_3$—, Cl—, Br—, F—, and $CH_3O$—.

Specific examples of the tetracarboxylic acid dianhydrides having the structure are aromatic tetracarboxylic acids such as p-phenylenebis(trimellitic acid monoester acid anhydride) (abbreviation: TMHQ), pyromellitic tetracarboxylic acid dianhydride (abbreviation: PMDA), 3,3',4,4'-biphenyltetracarboxylic acid dianhydride (BPDA), 2,3',3,4'-biphenyltetracarboxylic tetracarboxylic acid dianhydride, 3,3'-4,4'-benzophenonetetracarboxylic acid diandydride, and 1,4-bis(3,4-dicaroxyphenoxy)benzene tetracarboxylic acid dianhydride (abbreviation: BDPDA).

In addition, the tetracarboxylic acid dianhydride used in the present invention may be used not only for polymerization of a polymeric acid solution in which only one type of the tetracarboxylic acid dianhydrides having the above structure is used, but also for polymerization of a polyamic acid solution in which two or more types of the tetracarboxylic acid dianhydrides having the above structure are used. In case two or more types of the tetracarboxylic acid dianhydrides are used, it is possible to carry out the polymerization by using slurries of the two or more types of the tetracarboxylic acid dianhydrides. However, where it is appropriate, it is also possible to adopt, in the polymerization, a method of adding a slurry of one or more of the two or more types of the tetracarboxylic acid dianhydrides, and powder or a solution of the other one or more of the two or more types of the tetracarboxylic acid dianhydrides.

In the present invention, for manufacturing a rigid polyimide resin, it is preferable that one or more of the raw materials selected from the group of General Formula (2) be used to manufacture a polyamic acid solution, and the polyamic acid solution be used in manufacturing such polyimide resin. Note that, such rigid polyimide resin is preferable because such rigid polyimide resin having a rigid structure therein has a better heat resistance.

In the present invention, the tetracarboxylic acid dianhydride is used in a form of a slurry, that is, a tetracarboxylic acid dianhydride slurry is used. The slurry in the present invention is a fluidized suspension prepared by mechanically mixing powder of a solid into a liquid so as to disperse the powder of the solid in the liquid. The tetracarboxylic acid dianhydride is used as the powder of the solid, while a dispersion medium, which is described later, is used as the liquid.

In the tetracarboxylic acid dianhydride slurry of the present invention, a mixing ratio between the tetracarboxylic acid dianhydride and the dispersion medium is not particularly limited, and is decided, taking into account a dispersion condition of the tetracarboxylic acid dianhydride, a viscosity of the slurry, a stability of the slurry, and reactivity with diamine or a diamine solution.

However, for example, an upper limit of a weight ratio of the dispersion medium to the tetracarboxylic acid dianhydride is preferably 5, more preferably 3, further preferably 2, and especially preferably 1. In other words, the tetracarboxylic acid dianhydride slurry of the present invention is prepared by dispersing the tetracarboxylic acid dianhydride of 100 parts by weight maximally in the dispersion medium preferably of 500 parts by weight, more preferably of 300 parts by weight, further preferably of 200 parts by weight, and especially preferably of 100 parts by weight.

On the other hand, a lower limit of weight ratio of the dispersion medium to the tetracarboxylic acid dianhydride is preferably 0.5, and more preferably 0.8. In the other word, the tetracarboxylic acid dianhydride slurry of the present invention is prepared by dispersing the tetracarboxylic acid dianhydride of 100 parts by weight minimally in the dispersion medium preferably of 50 parts by weight, and more preferably of 80 parts by weight.

If the weight ratio of the dispersion medium to the tetracarboxylic acid dianhydride exceeds 5 thus giving an excess amount of the dispersion medium, such weight ratio may result in decrease in solids content in the resultant polyamic acid solution. On the other hand, the weight ratio of less than 0.5 may give the tetracarboxylic acid dianhydride slurry a low flowability, thereby manufacturing lumped dough in the tetracarboxylic acid dianhydride slurry. Of course, depending on which type of the dispersion medium and which type of the tetracarboxylic acid dianhydride are used in combination, the tetracarboxylic acid dianhydride of the present invention with a ratio out of the upper and lower limits may be suitably used.

The dispersion medium for use in the present invention may be a solvent applicable as the polymerization-use solvent that is later described. Especially, it is preferable that the same type of solvent or solvent mixture having the same composition be used as the polymerization-use solvent and the dispersion medium, because the manufacturing method of the polyamic acid includes a process of polymerizing the components, namely the tetracarboxylic acid dianhydride and diamine, after mixing the tetracarboxylic acid dianhydride slurry and diamine.

Specifically, in the manufacturing method of the present invention, the tetracarboxylic acid dianhydride slurry is added into powder or a solution of diamine, and then monomer components thereof are polycondensated, thereby polymerizing polyamic acid. Thus, the dispersion medium for dispersing the tetracarboxylic acid dianhydride slurry and the mixing-use solvent for preparing the diamine solution (the solution of diamine) is utilized as the polymerization-use solvent. Thus, it is preferable that the dispersion medium be the same type of solvent as the polymerization-use solvent. Note that specific types of the dispersion medium (polymerization-use solvent) and the like will be explained later. However, it is also possible to use other types of solvents as the dispersion medium, provided that the mixing of the solvents as the dispersion medium with the polymerization solvent will not result in layer separation.

In the present invention, it is preferable that the tetracarboxylic acid dianhydride have a low solubility in the dispersion medium (polymerization-use solvent). Specifically, that the tetracarboxylic acid dianhydride preferably has a solubility index Ns of 5 or less, and more preferably a solubility index Ns of 3 or less when the slurry has a temperature of 25° C., the solubility index Ns being specified by the following equation:

$$Ns=Wa/(Wa+Ws) \times 100 \quad (i),$$

where Wa is saturated dissolution weight of the tetracarboxylic acid dianhydride in the dispersion medium, and Ws is weight of the dispersion medium.

By specifying the solubility index Ns of the tetracarboxylic acid dianhydride in the dispersion-use solvent, it is possible to prepare a tetracarboxylic acid dianhydride slurry having a stable dispersion state (in other words, a tetracarboxylic acid dianhydride slurry in which the tetracarboxylic acid dianhydride is stably dispersed). As a result, it is possible to increase the solids content of the resultant polyamic acid solution.

In addition, it is expected that a tetracarboxylic acid dianhydride having a solubility index Ns of more than 5 be soluble in the dispersion medium. Thus, there is no particular problem in using a compound having Ns of more than 5 as a tetracarboxylic acid dianhydride. Thus, in the manufacturing method of the present invention, as specifically described in later-described Examples, not all of the tetracarboxylic acid dianhydride for use in the polymerization of polyamic acid should be slurried, that is, part of the tetracarboxylic acid dianhydride may be used in a form of powder, or may be used in a form of a solution, together with the tetracarboxylic acid dianhydride slurry.

Specifically, for example, BPDA has Ns of 4, while TMHQ has Ns of 3. Thus, it is very preferable that BPDA and TMHQ be slurried. On the other hand, for example, PMDA has Ns of 7. Thus, slurrying of PMDA is not required, while the slurrying of TMHQ can further improve efficiency of the polymerization of polyamic acid.

How to prepare the tetracarboxylic acid dianhydride slurry in the present invention is not particularly limited, provided that the tetracarboxylic acid dianhydride in the form of powder is mechanically mixed with the dispersion medium so as to sufficiently disperse the tetracarboxylic acid dianhydride in the dispersion medium. For example, in case the weight ratio of the tetracarboxylic acid dianhydride to the dispersion medium is large, a dispersing apparatus having a high ability of mixing slurries, such as various types of homogenizers, is suitably used. In case the slurry has a low viscosity, a simple type of disperser, such as a stirring apparatus with paddles.

The tetracarboxylic acid dianhydride for use in the tetracarboxylic acid dianhydride slurry in the present invention is not particularly limited, provided that the tetracarboxylic acid dianhydride is sufficiently dispersible in the dispersion medium. Tetracarboxylic acid dianhydrides in the form of powder that are generally commercially available may be used in preparing the tetracarboxylic acid dianhydride slurry, without any treatment. Thus, it is not necessary to take into account conditions such as an average particle diameter.

It is preferable that the tetracarboxylic acid dianhydride of the present invention have a storage stability to allow the tetracarboxylic acid dianhydride to be stored (preserved) stably (without quality deterioration) for a certain length of period, that is, to have a shelf life of a certain length of period. Here, the term "storage stability" means an ability of maintaining a slurry stage in which the tetracarboxylic acid dianhydride in the dispersion medium under a certain condition. Specifically, the tetracarboxylic acid dianhydride of the present invention has a storage stability to have a storage stability of one day or longer, preferably of one week (seven days) or longer.

As long as the tetracarboxylic acid dianhydride slurry has a storage stability to have a shelf life of one day or longer, it is not necessary to prepare the tetracarboxylic acid dianhydride slurry each time the polymerization of the polyamic acid is carried out. Thus, it is possible to avoid such a problem that difference between different lots of the tetracarboxylic acid dianhydride slurry affects quality of the polyamic acid. Thus, it is possible to stabilize the quality of the resultant polyamic acid, as long as the tetracarboxylic acid dianhydride slurry has a storage stability to have a shelf life of one day or longer.

Because the tetracarboxylic acid dianhydride is susceptible to moisture, it is very preferably that the preparation and storage of the tetracarboxylic acid dianhydride slurry, and the polymerization of the polyamic acid are carried out under a low-moisture and high-pressured environment due to an dehydrated atmosphere.

Specifically, it is preferable that the preparation and storage of the tetracarboxylic acid dianhydride slurry, and the polymerization of the polyamic acid be carried out under a controlled environment that is pressurized by using air, inert gas such as nitrogen gas, or argon gas, which has been subjected to dehydration by a well-known technology. To prepare the dehydrated atmosphere, inert gas is preferably used, while nitrogen gas is more preferably used. Pressure under the low-moisture high pressured environment is required only to be higher than normal pressure (atmospheric pressure), but has a lower limit preferably of 1.01 atm or more, more preferably of 1.03 atm or more, and further preferably of 1.05 atm or more.

The low-moisture high-pressure environment due to the dehydrated atmosphere is explained in more detail below. For example, consider a case of batchwise production of polyamic acid, in which the tetracarboxylic acid dianhydride slurry is prepared in a reaction apparatus for the polymerization of polyamic acid, and diamine is added therein. In this case, the low-moisture high-pressure environment due to the dehydrated atmosphere is realized in the reaction apparatus, in order to prevent the tetracarboxylic acid dianhydride in the slurry from being dehydrated by moisture. Similarly, for the storage of the tetracarboxylic acid dianhydride, the low-moisture high-pressure environment due to the dehydrated atmosphere is realized in a storage facility.

As indicated by General Formula (4), diamine used in the present invention has a structure having two amino group:

$$H_2N—R_4—NH_2 \quad \text{General Formula (4)}.$$

$R_4$ in General Formula (4) is preferably a divalent aromatic residual group including at least one six-carbon ring. However, it is more preferable that $R_4$ be one of divalent groups selected from the group consisting of the group represented by General Formula (5):

General Formula (5)

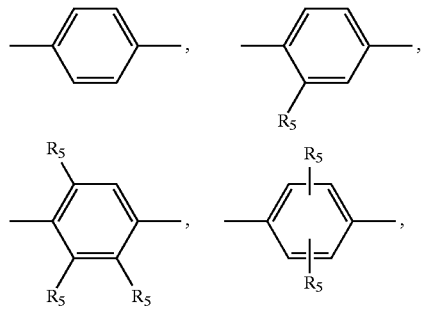

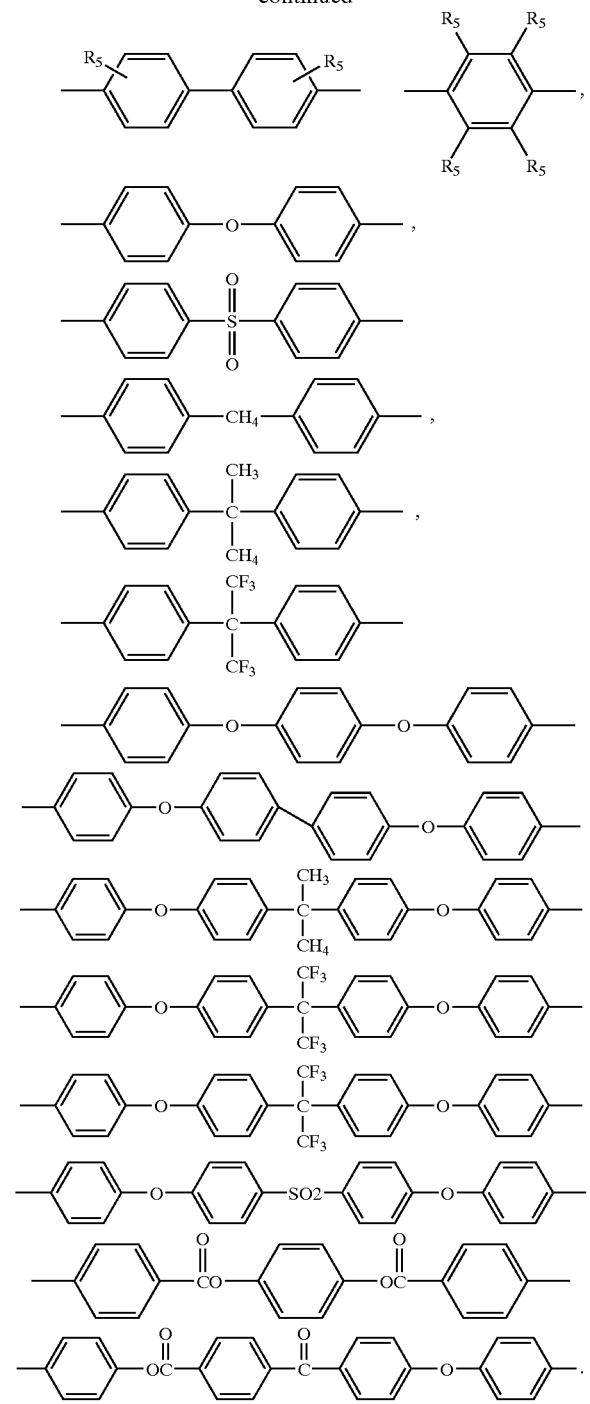

Note that $R_5$ in General Formula (5) is a substituent selected from the group consisting of H—, $CH_3$—, Cl—, Br—, F—, $CF_3$—, and $CH_3O$—.

Specific Examples of Diamine having the above structure are aromatic diamines such as paraphenylenediamine (abbreviation: p-PDA), 4,4-diaminodiphenylether (abbreviation: ODA), paraxylylenediamine, 4,4-diaminodiphenylmethane, 4,4-diaminodiphenylsulfone, benzidine, and 3,3'-dimethoxybenzidine.

In the present invention, diamine to be mixed together with the tetracarboxylic acid dianhydride is not limited to a particular form. For example, diamine may be used in a form of powder, or in a form of a diamine solution in which diamine is dissolved in the mixing-use solvent.

In case where diamine is used in the form of powder, a state of powder (such as an average particle diameter of particles in the powder) is not particularly limited, provided that diamine is in a so-called "powder form". Similarly, in case where diamine is used in the form of the diamine solution, a state of the solution (such as concentration of diamine) is not particularly limited, provided that diamine is dissolved at an appropriate concentration in the polymerization-use solvent, which is used also as the mixing-use solvent, as described above.

Compared with the tetracarboxylic acid dianhydride, diamine is more soluble in the polymerization-use solvent (mixing-use solvent). Thus, as to the state of diamine in mixing diamine in the tetracarboxylic acid dianhydride, it is possible to arbitrarily select the form of powder or the form of the diamine solution, depending on which type of diamine is used.

In addition, the diamine used in the present invention may be used not only for polymerization of a polymeric acid solution in which only one type of the diamines having the above structure is used, but also for polymerization of a polymeric acid solution in which two or more types of the diamines having the above structure are used. In case two or more types of the diamines are used, it is possible to carry out the polymerization by using slurries of the two or more types of the diamines. However, where it is appropriate, it is also possible to adopt, in the polymerization, a method of adding a slurry of one or more of the two or more types of the diamines, and powder or a solution of the other one or more of the two or more types of the diamines.

In the present invention, for manufacturing a rigid polyimide resin, it is preferable that in the group of General Formula (5) p-phenylenediamines having only one benzene ring or diamines having the benzidine structure in which two benzene rings are located in series, be used as an essential composition of the polyimide resin. Note that, such rigid polyimide resin is preferable because such rigid polyimide resin having a rigid structure therein has a better heat resistance.

The polymerization-use solvent in the manufacturing method of polyamic acid of the present invention is, as described above, a solvent applicable as the dispersion medium for the tetracarboxylic acid dianhydride slurry, and as the mixing-use solvent for the diamine solution. Specifically, non-protic organic solvent, a halogenated alkyl-type organic solvent, an aromatic organic solvent, an ether-type organic solvent, and the like are preferably used as the polymerization-use solvent.

Examples of the non-protic organic solvent are: ureas such as tetramethylurea, and N,N-dimethylurea; sulfoxides or sulfones such as dimethylsulfoxide, diphenylsulfone, tetramethylsulfone; amides such as N,N-dimethylacetoamide, N,N-dimethylformaldehyde, N-methyl-2-pyrrolidone, N,N'-diethyl-N-Methyl-2-pyrrolidone, γ-buthyllacone, hexamethyltriamidephosphate; phosphpryl amides; and the like.

Examples of the halogenated alkyl-type organic solvent are chloroform, methylene chloride, and the like. Moreover, examples of the aromatic organic solvent are aromatic hydrocarbons such as benzene, and toluene; phenols such as phenol and cresol; and the like. Further, examples of the ether-type organic solvent are dimethyl ether, diethyl ether, p-cresolmethylether, and the like.

The polymerization-use solvents listed above are usually used solely, but two or more of the polymerization-use solvent may be used in combination if necessary.

Among the polymerization-use solvents, the non-protic organic solvent is suitably used. Especially, the non-protic organic solvent such as N,N-dimethylacetoamide, N,N-dimethylformaldehyde and N-methyl-2-pyrrolidone, are suitably used.

The manufacturing method of polyamic acid, as described above, includes the steps of mixing the tetracarboxylic acid dianhydride slurry and diamine, and polycondensating those monomer components so as to polymerize polyamic acid.

Specifically, what is required in the manufacturing method of polyamic acid of the present invention is to use the tetracarboxylic acid dianhydride slurry in the step of polycondensating so as to polymerize polyamic acid. However, more specifically speaking, the manufacturing method of polyamic acid of the present invention includes the step of preparing the tetracarboxylic acid dianhydride slurry and the step of preparing a reaction solution by mixing the tetracarboxylic acid dianhydride slurry and diamine.

Further, the manufacturing method of polyamic acid of the present invention may include the step of removing foreign materials, adjusting concentration, and/or adding additives, as described above. In addition, the step of polymerizing polyamic acid may be a single-stage step, or a two-stage step.

In the manufacturing method of polyamic acid of the present invention, there is no particular limitation in how to prepare the reaction solution in the step of preparing the reaction solution, that is, how to mix the two components, namely the tetracarboxylic acid dianhydride slurry and diamine. For example, the reaction solution is prepared by adding the diamine solution or powder of diamine in the reaction vessel in which the tetracarboxylic acid dianhydride slurry has been added in advance, or by adding the tetracarboxylic acid dianhydride in the reaction vessel in which the diamine solution or powder of diamine has been added in advance. Note that the reaction solution is the mixture before the polymerization, that is, the polymerization solvent in which the two components, the tetracarboxylic acid dianhydride and diamine are dispersed or dissolved.

As described above, in the present invention, the tetracarboxylic acid dianhydride slurry is used in the step of preparing the reaction solution. Thus, by stirring the reaction solution thereafter, prompt dissolution of the tetracarboxylic acid dianhydride in the polymerization solvent can be attained. This improves efficiency in polymerization of polyamic acid, compared with the prior art in which the powder of the tetracarboxylic acid dianhydride is used.

Here, in the present invention, the polymerization of polyamic acid is initiated upon mixing of the tetracarboxylic acid dianhydride and diamine. Therefore, in reality, the step of preparing the reaction solution and the step of polymerizing polyamic acid cannot be divided distinctly. In this description, however, for easy explanation, the step of preparing the reaction solution and the step of polymerizing polyamic acid are discussed as if those steps are two clearly divided steps.

Thus, in the manufacturing method of polyamic acid of the present invention, in the step of preparing the reaction solution, there is no particular limitation in an adding rate for a component to be added later (later added component). The adding rate is decided in accordance with various factors relating to polymerization reaction heat generated during the step of polymerizing polyamic acid. Thus, the adding rate is decided with consideration of those factors.

Those factors are: (a) combination of types of the tetracarboxylic acid dianhydride and diamine, that is, heat generating factors, which directly relate to an amount of heat (polymerization heat) generated during the polymerization of polyamic acid; and (b) temperature controlling factors, which control the polymerization heat, for example, cooling capacity of a cooling apparatus provided to the reaction apparatus, pre-cooling of the component to be added later, and the like.

Unlike the prior art (using the powder of the tetracarboxylic acid dianhydride), the present invention uses the tetracarboxylic acid dianhydride slurry, whereby reaction rate between the tetracarboxylic acid dianhydride and diamine is increased. However, a degree of the increase of the reaction rate cannot be satisfactorily explained by considering only that the use of powder is substituted with the use of slurry so as to allow solid-liquid reaction between the tetracarboxylic acid dianhydride and diamine. In the present invention, therefore, it is necessary to decide the adding rate of the component to be added later, in view of the various factors.

In the polymerization of polyamic acid of the present invention, the polymerization heat is rapidly generated because the reaction between the tetracarboxylic acid dianhydride and diamine takes place at a higher reaction rate. Thus, temperature of the reaction solution is also increased rapidly. The high temperature of the reaction solution causes the polymerization of polyamic acid to compete with dissociation reaction of polyamic acid. Thus, in some cases, the dissociation reaction of polyamic acid surpasses the polymerization of the polyamic acid, thereby giving resultant polyamic acid a lower molecular weight.

Thus, in the polymerization reaction of polyamic acid, the temperature of the reaction solution is preferably 60° C. or less, more preferably 50° C. or less, further preferably 40° C. or less, and especially preferably 30° C. or less. Therefore, it is necessary to decide the adding rate with consideration of the temperature generating factors and the temperature controlling factors, in order to realize such temperature range.

As the temperature generating factor, an actual amount of heat generated may be used specifically as a reference. The actual amount of heat generated from the polymerization of polyamic acid may be measured for each type of the tetracarboxylic acid dianhydride and diamine, by using a well-known method.

As the temperature controlling factors, roughly speaking, there are two sub-factors, namely, the cooling capacity of the cooling apparatus, and the pre-cooling of the polymerization-use solvent.

In case the cooling apparatus is provided to the reaction apparatus, it is preferable to set the adding rate of the component to be added later so that an adding rate index M specified by the following Equation (ii) is less than or equal to a predetermined value, regardless of the type of the tetracarboxylic acid dianhydride and diamine:

$$M = Q1/Q2 \quad \text{(ii)},$$

where $Q1$ is an amount (unit J/min) of heat generated for unit time (one minute), calculated by dividing a sum amount of heat generated by the polymerization reaction by addition time (min) which is a time period which the addition of the later-added component takes, while $Q2$ is an amount (cooling capacity, unit J/min) of heat of cooling per unit minute (one minute) by the cooling apparatus, calculated by the addition time (min). Note that $Q2$ is a cooling capacity specified taking in to account the fact that the cooling capacity is varied depending on a contacting area between a reaction liquid and the cooling apparatus.

When the addition rate index M is less than or equal to 1, sufficient radiation of heat from the reaction solution can be performed by the cooling, thereby avoiding rapid increase in the reaction temperature. However, it is more preferable that the addition rate index M be less than or equal to 0.5.

In case where the later-added component is the tetracarboxylic acid dianhydride slurry, in general, the temperature of the diamine solution that has been added in the reaction vessel in advance is preferably 40° C. or less, more preferably 20° C. or less, further preferably 10° C. or less, and especially preferably 0° C. or less. By setting the temperature in this range, it is possible to stably carry out the polymerization of polyamic acid, and suppress a change in the temperature of the reaction solution, which may occur as the polymerization takes place.

It should be noted that temperature of 10° C. or less causes recrystalization of a small amount of the tetracarboxylic acid dianhydride, which is dissolved in the dispersion medium, thereby hardening (solidifying) the tetracarboxylic acid dianhydride slurry. Thus, for stabilizing the tetracarboxylic acid dianhydride by maintaining the flowability thereof, the temperature of the slurry is preferably more than 10° C. at least, more preferably 20° C., and especially more than 25° C.

However, temperature (hardening (or solidifying) temperature) at which the tetracarboxylic acid dianhydride slurry is hardened (solidified) is varied depending on which type of the dispersion medium and the tetracarboxylic acid dianhydride are used. Therefore, when the tetracarboxylic acid dianhydride is added later, preferable temperature of the tetracarboxylic acid dianhydride slurry is not limited to a particular temperature range. Furthermore, for the preparation of the tetracarboxylic acid dianhydride slurry, it is preferable to select a dispersion medium suitable for a recrystalization temperature of the tetracarboxylic acid dianhydride.

On the other hand, in case the later-added component is diamine, it is necessary to add diamine while the temperature of the tetracarboxylic acid dianhydride slurry is above the hardening (solidifying) temperature of the tetracarboxylic acid dianhydride slurry. Therefore, the temperature of the tetracarboxylic acid dianhydride slurry is preferably above 10° C. and less than and equal to 60° C., and more preferably above 20° C. and less than or equal to 40° C. Of course, the hardening (solidifying) temperature of the tetracarboxylic acid dianhydride slurry is decided depending on the types of the dispersion medium and the tetracarboxylic acid dianhydride, as described above. Thus, in case diamine is added later, the preferable temperature of the tetracarboxylic acid dianhydride slurry is not limited to the temperature ranges.

In the manufacturing method of polyamic acid of the present invention, polyamic acid is synthesized by the step of polymerizing polyamic acid. The polymerization of polyamic acid is carried out by using a conventional and well-known art suitably. Specifically, in terms of procedure, temperature/pressure conditions and the like of the polymerization, except the conditions and the steps above, the conventional and well-known art may be used.

For example, the polymerization of polyamic acid may be carried out in two stages. Specifically, the polymerization of polyamic acid may be so arranged that, in the first stage, a prepolymer, which is polyamic acid having low viscosity, is polymerized, and then, in the second stage, a polyamic acid solution having high viscosity is produced with the tetracarboxylic acid dianhydride gradually added. In short, in the present invention, the step of polymerizing polyamic acid may include the first step (stage) of polymerizing the prepolymer, and the second step (stage) of completing the polymerization of polyamic acid.

Furthermore, in the polymerization carried out via the two stages, a step of removing foreign materials may be carried out between the first stage (the step of polymerizing the prepolymer) and the second stage (the step of completing the polymerization of polyamic acid).

The step of removing the foreign materials, is a step of removing an insoluble raw material or mix-in foreign materials by using, for example, a filter or the like. This reduces the foreign materials in the final formed product of polyimide resin, and defects. Moreover, even if varnish is continuously polymerized, it is possible to improve quality of the varnish by removing insoluble raw materials and mix-in foreign materials in the varnish.

The insoluble raw materials and mix-in foreign materials in the varnish not only affect outer appearance of the formed product of the polyimide resin, but also cause molecular-structural defects in the formed product of the polyimide resin. For example, in case the formed product of the resin is a polyimide film, and a metal layer is formed on a surface thereof, a defect on the surface of the film due to the insoluble raw materials or mix-in foreign materials deteriorates cohesiveness between the polyimide film and the metal layer.

There is no particular limitation in terms of a mesh size of the filter. However, in case the final formed product of the polyimide resin is a film, the mesh size of the filter is preferably a half, more preferably one fifth, and one tenth of a thickness of the film.

Moreover, the step of polymerizing polyamic acid may be carried out in a single step. Namely, it is possible to produce the polyamic acid solution having a high viscosity by using a single reaction apparatus and via a single step, without going through a state of the prepolymer. Further, the monomer as the raw materials, that is, the tetracarboxylic acid dianhydride slurry and diamine may be continuously added in order to perform such polymerization that the viscosity of the polyamic acid solution is continuously increased.

The polyamic acid solution of the present invention contains polyamic acid obtained by the manufacturing method of polyamic acid of the present invention. More specifically, the polyamic acid solution of the present invention is obtained by dissolving, in an arbitral organic solvent, polyamic acid obtained by the manufacturing method.

According to the present invention, it is possible to manufacture the polyamic acid solution itself. Therefore, it is possible to utilize the polymerization-use solvent as the arbitral organic solvent in manufacturing the polyamic acid solution of the present invention.

In other words, the manufacturing method of the present invention is also a manufacturing method of the polyamic acid solution, but not limited thereto. For example, it may be so arranged that the polymerization-use solvent is removed from the polyamic acid solution obtained by the manufacturing method of the present invention so as to obtain solid polyamic acid. Moreover, it may be so arranged that the thus obtained solid polyamic acid is dissolved in another organic solvent so as to prepare a polyamic acid solution.

In present invention, the use of the tetracarboxylic acid dianhydride improves dissolving rate of the tetracarboxylic acid dianhydride in a reaction system, compared with the prior art in which the powder of tetracarboxylic acid dianhydride is used. This increases a reaction rate of the reaction between the tetracarboxylic acid dianhydride and diamine. Further, the increase in the reaction rate exceeds a theoretical value expected from the substitution of the powder with the slurry. This improves productivity of polyamic acid very much.

As described above, according to the manufacturing method of polyamic acid of the present invention, it is possible to directly produce the polyamic acid solution. The polyamic acid solution thus directed produced has a solids content, that is, concentration of 10% by weight or more.

Here, the solids content indicates concentration of the whole nonvolatile components in the polyamic acid solution, from which the polymerization-use solvent is excluded. Thus, the solids content substantially indicates the concentration of polyamic acid in the polyamic acid solution. Therefore, the solids content C is calculated by the following Equation (iii):

$$\text{Solids Content } C=(Wp/Ws)\times 100 \qquad \text{(iii)},$$

where Ws is total weight of the polyamic acid solution, and Wp is weight of polyamic acid in the polyamic acid solution.

In the polyamic acid solution of the present invention, the solids content C may have any value as long as the solids content C is 10% by weight or more. In other words, it is possible to manufacture a polyamic acid solution having a high solids content, which is more than or equal to 10% by weight, by using the manufacturing method of the polyamic acid solution of the present invention.

However, in the polyamic acid solution of the present invention, practicality of the polyamic acid solution may be attained even if the solids content C is less than 10%. Specifically, in the polyamic acid solution of the present invention, a lower limit of the solids content is necessarily 5% by weight or more, and is more preferably 10% by weight or more. On the other hand, an upper limit of the solids content C is necessarily 40% or less, preferably 30% or less, and more preferably 25% or less.

With respect to handing, the weight of polyamic acid in the polyamic acid solution of the present invention, has a preferable range, specifically. Polyamic acid dissolved in the organic solvent is preferably in a range between 5 parts and 40 parts by weight, more preferably in a range between 10 parts and 30 parts by weight, and especially preferably in a range between 10 part and 25 parts by weight, where polyamic acid solution is 100 parts by weight.

If the solids content C is less than 5% by weight, amount of the organic solvent is too much in the polyamic acid solution, thus disadvantageously increasing cost in removal of the organic solvent in manufacturing the formed product of the polyimide resin. On the other hand, it is not practical to prepare a polyamic acid solution having a solids content C of more than 40% by weight.

In addition, by appropriately selecting the combination of the tetracarboxylic acid dianhydride and diamine, and an organic solvent for dissolving polyamic acid therein, it is also possible to prepare a polyamic acid solution having a solids content of 40% by weight or more.

Provided that polyamic acid in the polyamic acid solution of the present invention is manufactured by the manufacturing method of the present invention, polyamic acid is not limited to a particular average molecular weight. In other words, preferable average molecular weight is varied depending on shapes and usage of the final formed product of the polyimide resin. Thus, it is possible to control the average molecular weight of resultant polyamic acid by changing various conditions in the step of polymerizing polyamic acid.

For example, in case where the final formed product of the polyimide resin is a film, it is preferable in terms of property of the film that polyamic acid has a number average molecular weight as much as 10,000 or more molar equivalent of PEG (polyethylene glycol) measured by gel permissive chromatography (GPC).

The organic solvent in the polyamic acid solution of the present invention is not particularly limited, as long as the organic solvent is capable of dissolving polyamic acid therein, and does not hinder usage of the polyamic acid solution (specifically, the production of the formed product of polyimide resin, and the like usage). However, it is possible to preferably use the solvents listed as the polymerization-use solvent (or dispersion medium, or mixing-use solvent) in the manufacturing method of the present invention.

As described above, in the present invention, it is possible to use the thus obtained polyamic acid solution directly, because it is possible to directly manufacture the polyamic acid solution by using the manufacturing method. However, it may also be so arranged that the solids content C is reduced by adding an appropriate amount of the organic solvent, before using the polyamic acid solution.

The polyamic acid solution obtained by the manufacturing method of the present invention has such high solids content C higher or equal to 10% by weight. However, the lower limit of the preferable range of the solids content C is 5% or more, which is less than the solids content C of the polyamic acid solution obtained by the manufacturing method of the present invention. Thus, it may be so arranged as to add an appropriate amount of the organic solvent so as to control the solids content C. In other words, the manufacturing method of polyamic acid of the present invention may include a step of controlling concentration so as to control the solids content C, after the step of polymerizing polyamic acid.

The polyamic acid solution of the present invention may contain various additive if necessary, apart from polyamic acid and the organic solvent. In other words, the manufacturing method of the present invention may include a step of adding an additive so as to add various additives if necessary. Specifically, the additive may be, but not limited to, an antioxidant, a light stabilizer, a fire retardant, an antistatic agent, a heat stabilizer, a ultraviolet stabilizer, an inorganic filler, a metal particulate, or various types of hardeners (coupling agents), for example.

Further, it may be so arranged that the polyamic acid solution contains two or more types of polyamic acid. For example, it may be so arranged that the polyamic acid solution including two or more types of polyamic acid is prepared by mixing (a) the polyamic acid solution manufactured by the manufacturing method of the present invention with (b) a polyamic acid solution produced by another polymerization. Moreover, it may be so arranged that polyamic acid solutions having different average molecular weights etc. are produced by carrying out the manufacturing method of the present invention with different conditions in the step of polymerizing polyamic acid, and mixed together.

However, in case where a plural types of the polyamic acid solutions are mixed together, it is necessary that each polyamic acid has the same terminal group. Specifically, the terminal group of polyamic acid is an acid or amine. When both polyamic acid molecules have the same type of terminal group, that is, an acidic terminal group or an amino terminal group, both the polyamic acid molecules can be mixed together. In other words, polyamic acid having the acidic terminal group and polyamic acid having the amino terminal group cannot be mixed together.

According to the manufacturing method of polyamic acid of the present invention, in which the tetracarboxylic acid dianhydride slurry is used, as described above, it is possible to polymerize the components of the tetracarboxylic acid dianhydride slurry and the diamine solution, by carrying out the solid-liquid reaction between the tetracarboxylic acid dianhydride and the diamine solution. Thus, even though the tetracarboxylic acid dianhydride has low solubility in the polymerization-use solvent, it is possible to directly manufacture the polyamic acid solution of high concentration with high efficiency. Furthermore, the manufacturing method of the present invention significantly improves the dissolving rate of the tetracarboxylic acid dianhydride, thus further improving productivity of polyamic acid.

Next, as an example, explained is a manufacturing method in which a polyimide film is formed from the polyamic acid solution of the present invention and used.

In order to prepare a polyimide film from the polyamic acid solution of the present invention, either of a thermal method in which heat is applied to perform dehydrogenation to close a ring, or a chemical method in which a catalyst and a dehydrogenating agent is used to perform the same, may be adopted. The chemical method is preferred to the thermal method, because the chemical method gives the resultant polyimide film better mechanical properties, such as an elongation percentage, a tensile strength, and the like. Moreover, it is also an advantage of the chemical method that the imidification is completed in a shorter time in the chemical method than in the thermal method. In addition, it is also possible to adopt the thermal method and the chemical method together.

As typical methods of manufacturing a polyimide film from a solution of polyamic acid in an organic solvent, a chemical ring-closure method and a thermal ring-closure method will be explained in the following.

To begin with, the chemical ring-closure method will be explained. Firstly, a dehydrogenating agent and catalyst of more than stoichiometric quantities are mixed in a solution of polyamic acid in an organic solvent, so as to prepare a mixture solution thereof. Next, flow casting of the mixture solution on a supporting body such as a drum, an endless belt, or the like is carried out by flowing the mixture solution from a slit-like shaped outlet. Then, the flow cast mixture solution is heated, to dryness, at a temperature of 200° C. or less for 1 to 20 minutes, thereby forming a gel film having a self-supporting property. After that, the gel film is peeled off from the supporting body. Then, two corresponding edges of the film are fixedly held. After that, the film is heated at a temperature elevated from 100° C. to 500° C., in order to carry out imidification. The temperature is elevated gradually or in a stepwise manner. After gradually cooled, the edges are released. In this way, a polyimide film is obtained.

Next, the thermal ring-closure method will be explained. In the thermal ring closure method, a mixture in which no dehydrogenating agent nor catalyst is included is used. Flow casting of the mixture solution on a supporting body such as a drum, an endless belt, or the like is carried out by flowing the mixture solution from a slit-like shaped outlet. Then, the flow cast mixture solution is heated, to dryness, at a temperature of 200° C. or less for 1 to 20 minutes, thereby forming a gel film having a self-supporting property. After that, the gel film is peeled off from the supporting body. Then, two corresponding edges of the film are fixedly held. After that, the film is heated at a temperature elevated from 100° C. to 500° C., in order to carry out imidification. The temperature is elevated gradually or in a stepwise manner. After gradually cooled, the edges are released. In this way, a polyimide film is obtained.

Note that it is possible to use both the chemical ring-closure method and the thermal ring-closure method together for manufacturing the polyimide film.

Examples of the dehydrogenating agent for use in the chemical ring-closure method are aliphatic acidic anhydrides, such as acetic dianhydride, aromatic anhydrides, and the like. Examples of the catalyst are aliphatic tertiary amines such as trimethylamines, aromatic tertiary amines such as dimethylaniline, heterocyclic tertiary amines such as pyridine, isoquinoline, and the like.

It is preferable that, prior to the mixing of the dehydrogenating agent and catalyst into the solution in which polyamic acid is dissolved in the organic solvent, a step of removing, by using a filter or the like, insoluble raw materials and mix-in foreign materials be provided in order to reduce the foreign materials in the film, and defects. A defect on the surface of the polyimide film due to the insoluble raw materials or mix-in foreign materials deteriorates cohesiveness between the polyimide film and the metal layer in the step of forming the metal layer. A mesh size of the filter is preferably a half, more preferably one fifth, and one tenth of a thickness of the film to be manufactured.

Content of the dehydrogenating agent and catalyst with respect to polyamic acid depend on a constitutional formula of polyamic acid. Specifically, the content of the dehydrogenating agent and catalyst with respect to polyamic acid is preferably in the following ranges. Namely, as to the content of the dehydrogenating agent, a ratio of a number of moles of the dehydrogenating agent to a number of moles of amino groups in polyamic acid preferably falls in a range between 10 to 0.01. As to the content of the catalyst, a ratio of a number of moles of the catalyst to the number of moles of the amino groups in polyamic acid preferably falls in a range between 10 to 0.01. Furthermore, the ratio of the number of moles of the dehydrogenating agent to the number of moles of the amino groups in polyamic acid more preferably falls in a range between 5 to 0.5, while the ratio of the number of moles of the catalyst to the number of moles of the amino groups in polyamic acid more preferably falls in a range between 5 to 0.5. In addition, in this case, it is possible to also use a reaction retardant such as acetyl acetone and the like, together with the dehydrogenating agent and the catalyst.

Moreover, the content of the dehydrogenating agent and the catalyst in polyamic acid with respect to polyamic acid may be decided in accordance with a time period (pot life) from a time at which the mixing of the dehydrogenating agent and the catalyst with polyamic acid at 0° C., to a time at which viscosity starts increasing. In general, the pot life is preferably in a range between 0.1 minutes and 60 minutes, and more preferably between 0.5 minutes and 20 minutes.

Moreover, when the polyimide film of the present invention plays a role of central skeletal film, thin lamination of a polyamic acid solution on a surface thereof will not cause a significant effect in terms of properties. For example, a copolymerized polyamic acid solution in which BPDA and ODA are copolymerized, a copolymerized polyamic acid solution in which BPDA and PDA are copolymerized, or a copolymerized polyamic acid solution in which PMDA and ODA are copolymerized may be used as the polyamic acid solution to be laminated. When the thus applied film (lamination) has a thicker thickness, such thick thickness significantly changes the properties of the applied film. However, the applied film is evenly applied all over the film. Thus, as long as there is no pin hole, there is no problem. The thickness of the applied film is preferably in a range between 20 nm and 5 μm, and more preferably in a range between 20 nm and 1 μm.

Examples of final products and coating materials produced from the polyamic acid solution of the present invention are listed here, but the application of the polyamic acid solution of the present invention are not limited thereto. For examples, the polyamic acid solution of the present invention may be used to manufacture: a heat resistant insulating tape, heat resistant sticky tape, a high-density magnetic recording base, a capacitor, a film used in a flexible printed circuit (FPC); circular movement members in which a fluorine resin, graphite or the like is filled, structural members reinforced with glass fibers or carbon fibers, formed material or formed products such as bobbins of small-sized coils, sleeves, tubes for insulating a terminal; laminating materials insulating spacer for power transistors, magnetic head spacers, spacers for power relay, spacers for transformers, and the like; insulative coating of electric wires and cables, solar batteries, cold storage tanks, heat insulating materials for cosmic use, integrated circuits, and enamel coating materials such as a slot liner and the like; ultrafilters, reverse osmosis membranes, and gas separating film; heat resistant strings, heat resistant foot cloths, and heat resistant nonwoven cloths; and the like.

In the following, the present invention will be specifically explained with reference to Examples and Comparative Examples. However, Those Examples and Comparative Examples are not to limit the present invention thereto. Viscosities of polyamic acid solutions obtained in Examples and Comparative Examples were measured as follows.

[Measurement of Viscosity]

A viscosity (unit: Pa·s) of the polyamic acid solution was measured using a B-type viscometer, based on a polyamic acid solution that was maintained for one hour in a water bath kept at 23° C. The viscosity was measured by using a No. 7 rotor, which was rotated at 4 rpm.

EXAMPLE 1

In this Example, a polyamic acid was produced using a reactor equipped with: a stainless-steel separable flask as a reaction vessel; two paddle blades as a stirrer in the separable flask; and a cooling device with a cooling capacity of 20.9 kJ/min. During the course of polymerization, nitrogen gas, which had been dehydrated by passing through a silica gel, was flown into the reaction vessel at a flow rate of 0.05 L/min, so as to avoid entry of moisture.

First, the separable flask was charged with 265.6 g of N,N-dimethylformamide (DMF) as a polymerization-use solvent, followed by 10.1 g of 4,4-diaminodiphenylether (ODA) and 18.5 g of paraphenylenediamine (p-PDA). The mixture was stirred at 20° C. to completely dissolve the ODA and p-PDA in the DMF. The result was a diamine solution.

Separately, 100 g of p-phenylenebis(trimellitic acid monoester anhydride) (TMHQ: solubility index Ns=3) was added to 300 g of DMF, which was provided as a dispersion medium. The mixture was stirred with a homogenizer so as to prepare a TMHQ slurry with a TMHQ:DMF weight ratio of 1:3.

184.0 g of the TMHQ slurry so prepared was gradually added to the diamine solution and stirred therein, so as to sufficiently disperse the TMHQ in the diamine solution. Note that, the TMHQ slurry was added with an addition rate index M=0.68.

Here, the time required for the dispersion of TMHQ to completely dissolve in the polymerization-use solvent DMF was measured.

Thereafter, 23.9 g of powdery PMDA was gradually added to the mixture of the diamine solution and TMHQ slurry. The mixture was stirred with the stirrer for 40 minutes.

Further, in order to adjust the amount of tetracarboxylic acid dianhydride added to attain a predetermined viscosity (here, a range of 200 Pa·s to 400 Pa·s, inclusive), 2.40 g of PMDA powder was gradually added and stirred in the mixture of the diamine solution, TMHQ slurry, and PMDA until a predetermined viscosity was obtained. The concentration of the diamine and tetracarboxylic acid dianhydride in this reaction mixture was 20% by weight with respect to the total reaction mixture.

The polyamic acid was polymerized by continuously stirring and cooling the mixture for 1 hour, so as to obtain a polyamic acid solution (1). Table 1 shows the dissolution time of the tetracarboxylic acid dianhydride (TMHQ), the solids content C, and the viscosity of the polyamic acid solution (1).

EXAMPLE 2

A polyamic acid solution (2) was obtained as in Example 1 except that 433.8 g of DMF was added as a polymerization-use solvent. The concentration of the diamine and tetracarboxylic acid dianhydride in the reaction mixture was 15% by weight with respect to the total reaction mixture. Table 1 shows the dissolution time of the tetracarboxylic acid dianhydride (TMHQ), the solids content C, and the viscosity of the polyamic acid solution (2).

EXAMPLE 3

The reactor of Example 1 was used to produce a polyamic acid.

The separable flask was charged with 484.6 g of DMF, which was provided as a polymerization-use solvent (dispersion medium). 46.0 g of TMHQ was then added to the DMF and sufficiently stirred therein with the stirrer, so as to prepare a TMHQ slurry.

Thereafter, 30.1 g of ODA and 7.6 g of p-PDA, both in a powdery form (a form of powder), were gradually added to the TMHQ slurry and adequately stirred therein.

Here, the time required for the dispersion of TMHQ to completely dissolve in the polymerization-use solvent DMF was measured.

23.9 g of PMDA was then added and stirred with the stirrer for 40 minutes.

Further, in order to obtain a predetermined viscosity (here, a range of 200 Pa·s to 400 Pa·s, inclusive), 2.40 g of powdery PMDA powder was gradually added and stirred in the mixture of the TMHQ slurry and PMDA until a predetermined viscosity was obtained. The concentration of the diamine and tetracarboxylic acid dianhydride in this reaction mixture was 15% by weight with respect to the total reaction mixture.

The polyamic acid was polymerized by continuously stirring and cooling the mixture for 1 hour, so as to obtain a polyamic acid solution (3). Table 1 shows the dissolution time of the tetracarboxylic acid dianhydride (TMHQ), the solids content C, and the viscosity of the polyamic acid solution (3).

EXAMPLE 4

A polyamic acid solution (4) was obtained as in Example 3 except that 330.0 g of DMF was added as a polymerization-use solvent. The concentration of the diamine and tetracarboxylic acid dianhydride in the reaction mixture was 15% by weight with respect to the total reaction mixture. Table 1 shows the dissolution time of the tetracarboxylic acid dianhydride (TMHQ), the solids content C, and the viscosity of the polyamic acid solution (4).

EXAMPLE 5

The reactor of Example 1 was used to prepare a polyamic acid.

The separable flask was charged with 484.7 g of DMF, which was provided as a polymerization-use solvent (dispersion medium). 46.0 g of TMHQ was then added to the DMF and sufficiently stirred therein with the stirrer, so as to prepare a TMHQ slurry. Further, 26.3 g of powdery PMDA was added and adequately stirred, so as to prepare a mixed slurry of TMHQ and PMDA.

Thereafter, 30.1 g of ODA and 6.4 g of p-PMDA, both in a powdery form, were gradually added and sufficiently stirred. The resulting reaction mixture was stirred and cooled as in Example 1 and the time required for the TMHQ to completely dissolve was measured.

Further, in order to obtain a predetermined viscosity (here, a range of 200 Pa·s to 400 Pa·s, inclusive), 1.20 g of powdery p-PDA was gradually added and stirred in the mixture of the TMHQ, PMDA, and diamine until a predetermined viscosity was obtained. The concentration of the diamine and tetracarboxylic acid dianhydride in this reaction mixture was 18.5% by weight with respect to the total reaction mixture.

The polyamic acid was polymerized by continuously stirring and cooling the mixture for 1 hour, so as to obtain a polyamic acid solution (5). Table 1 shows the dissolution time of the tetracarboxylic acid dianhydride (TMHQ and PDMA), the solids content C, and the viscosity of the polyamic acid solution (5).

EXAMPLE 6

A polyamic acid solution (6) was obtained as in Example 5 except that 275.9 g of DMF was added as a polymerization-use solvent. The concentration of the diamine and tetracarboxylic acid dianhydride in the reaction mixture was 28.5% by weight with respect to the total reaction mixture. Table 1 shows the dissolution time of the tetracarboxylic acid dianhydride (TMHQ and PMDA), the solids content C, and the viscosity of the polyamic acid solution (6).

EXAMPLE 7

A polyamic acid solution (7) was prepared as in Example 1 except that 248.3 g of DMF was added as a polymerization-use solvent and 118.0 g of a slurry of 4,4'-biphenyltetracarboxylic acid dianhydride (BPDA: solubility index Ns=4) (BPDA slurry), which had been prepared by dispersing BPDA, instead of TMHQ, in DMF was used. The concentration of the diamine and tetracarboxylic acid dianhydride in the reaction mixture was 20% by weight with respect to the total reaction mixture. Table 1 shows the dissolution time of the tetracarboxylic acid dianhydride (BPDA), the solids content C, and the viscosity of the polyamic acid solution (7).

EXAMPLE 8

A polyamic acid solution (8) was obtained as in Example 7 except that 388.6 g of DMF was added as a polymerization-use solvent. The concentration of the diamine and tetracarboxylic acid dianhydride in the reaction mixture was 15% by weight with respect to the total reaction mixture. Table 1 shows the dissolution time of the tetracarboxylic acid dianhydride (BPDA), the solids content C, and the viscosity of the polyamic acid solution (8).

EXAMPLE 9

A polyamic acid solution (9) was prepared as in Example 3 except that 411.7 g of DMF was added as a polymerization-use solvent and 29.5 g of BPDA was used instead of TMHQ. The concentration of the diamine and tetracarboxylic acid dianhydride in the reaction mixture was 18.5% by weight with respect to the total reaction mixture. Table 1 shows the dissolution time of the tetracarboxylic acid dianhydride (BPDA), the solids content C, and the viscosity of the polyamic acid solution (9)

EXAMPLE 10

A polyamic acid solution (10) was obtained as in Example 9 except that 280.3 g of DMF was added as a polymerization-use solvent. The concentration of the diamine and tetracarboxylic acid dianhydride in the reaction mixture was 25% by weight with respect to the total reaction mixture. Table 1 shows the dissolution time of the tetracarboxylic acid dianhydride (BPDA), the solids content C, and the viscosity of the polyamic acid solution (10).

EXAMPLE 11

A polyamic acid solution (11) was prepared as in Example 1 except that 303.5 g of DMF was added as a polymerization-use solvent and 160.0 g of a slurry of 1,4-bis(3,4-dicarboxyphenoxy)benzene tetracarboxylic acid dianhydride (BDPDA: solubility index Ns=4.5) (BDPDA slurry), which had been prepared by dispersing BDPDA, instead of TMHQ, in DMF was used. The concentration of the diamine and tetracarboxylic acid dianhydride in the reaction mixture was 20% by weight with respect to the total reaction mixture. Table 1 shows the dissolution time of the tetracarboxylic acid dianhydride (BDPDA), the solids content C, and the viscosity of the polyamic acid solution (11).

EXAMPLE 12

A polyamic acid solution (12) was obtained as in Example 11 except that 480.0 g of DMF was added as a polymerization-use solvent. The concentration of the diamine and tetracarboxylic acid dianhydride in the reaction mixture was 15% by weight with respect to the total reaction mixture. Table 1 shows the dissolution time of the tetracarboxylic acid dianhydride (BDPDA), the solids content C, and the viscosity of the polyamic acid solution (12).

Comparative Example 1

A comparative polyamic acid solution (1) was prepared as in Example 1 except that 46.0 g of TMHQ was added in the form of a powder, not slurry, and 403.6 g of DMF was added first. Table 1 shows the dissolution time of the tetracarboxylic acid dianhydride (TMHQ), the solids content C, and the viscosity of the comparative polyamic acid solution (1). Note that, the PMDA powder was added in such an amount that the number of moles of tetracarboxylic acid dianhydride was theoretically equal to the number of moles of diamine to end the reaction.

Comparative Example 2

A comparative polyamic acid solution (2) was prepared as in Comparative Example 1 except that 571.8 g of DMF was added first. Table 1 shows the dissolution time of the tetracarboxylic acid dianhydride (TMHQ), the solids content C, and the viscosity of the comparative polyamic acid solution (2). Note that, the PMDA powder was added in such an amount that the number of moles of tetracarboxylic acid dianhydride was theoretically equal to the number of moles of diamine to end the reaction.

Comparative Example 3

A comparative polyamic acid solution (3) was prepared as in Example 7 except that 29.5 g of BPDA was added in the form of a powder, not slurry, and 336.9 g of DMF was added first. Table 1 shows the dissolution time of the tetracarboxylic acid dianhydride (BPDA), the solids content C, and the viscosity of the comparative polyamic acid solution (3). Note that, the PMDA powder was added in such an amount that the number of moles of tetracarboxylic acid dianhydride was theoretically equal to the number of moles of diamine to end the reaction.

Comparative Example 4

A comparative polyamic acid solution (4) was prepared as in Comparative Example 3 except that 477.2 g of DMF was added first. Table 1 shows the dissolution time of the tetracarboxylic acid dianhydride (BPDA), the solids content C, and the viscosity of the comparative polyamic acid solution (4). Note that, the PMDA powder was added in such an amount that the number of moles of tetracarboxylic acid dianhydride was theoretically equal to the number of moles of diamine to end the reaction.

Comparative Example 5

A comparative polyamic acid solution (5) was prepared as in Example 11 except that 40.0 g of BDPDA was added in the form of a powder, not slurry, and 423.6 g of DMF was added first. Table 1 shows the dissolution time of the tetracarboxylic acid dianhydride (BDPDA), the solids content C, and the viscosity of the comparative polyamic acid solution (5). Note that, the PMDA powder was added in such an amount that the number of moles of tetracarboxylic acid dianhydride was theoretically equal to the number of moles of diamine to end the reaction.

Comparative Example 6

A comparative polyamic acid solution (6) was prepared as in Comparative Example 5 except that 600.9 g of DMF was added first. Table 1 shows the dissolution time of the tetracarboxylic acid dianhydride (BDPDA), the solids content C, and the viscosity of the comparative polyamic acid solution (6). Note that, the PMDA powder was added in such an amount that the number of moles of tetracarboxylic acid dianhydride was theoretically equal to the number of moles of diamine to end the reaction.

EXAMPLE 13

The reactor of Example 1 was used to produce a polyamic acid.

The separable flask was charged with 206.4 g of DMF, which was provided as a polymerization-use solvent (dispersion medium). 34.2 g of ODA was then added to the DMF and sufficiently stirred therein at 20° C. with the stirrer, so as to prepare a diamine solution in which the ODA is completely dissolved in the DMF.

Separately, 100 g of PMDA (solubility index Ns=7) was added to 300 g of DMF, which was provided as a dispersion medium. The mixture was stirred with a homogenizer so as to prepare a PMDA slurry with a PMDA:DMF weight ratio of 1:3.

144.8 g of the PMDA slurry so prepared was gradually added to the diamine solution and stirred therein, so as to sufficiently disperse the PMDA in the diamine solution.

Here, the time required for the dispersion of PMDA to completely dissolve in the polymerization-use solvent DMF was measured. After the PMDA has completely dissolved, the mixture was stirred with the stirrer for 40 minutes.

Further, in order to adjust the amount of tetracarboxylic acid dianhydride added to obtain a predetermined viscosity (here, a range of 200 Pa·s to 400 Pa·s, inclusive), 1.09 g of powdery PMDA was gradually added and stirred in the mixture of the diamine solution and PMDA slurry until a predetermined viscosity was obtained. The concentration of the diamine and tetracarboxylic acid dianhydride in this reaction mixture was 18.5% by weight with respect to the total reaction mixture.

The polyamic acid was polymerized by continuously stirring and cooling the mixture for 1 hour, so as to obtain a polyamic acid solution (13). Table 1 shows the dissolution time of the tetracarboxylic acid dianhydride (PDMA), the solids content C, and the viscosity of the polyamic acid solution (13).

Comparative Example 7

A comparative polyamic acid solution (7) was prepared as in Example 13 except that 36.2 g of PMDA was added in the form of a powder, not slurry, and 316.0 g of DMF was added first. Table 1 shows the dissolution time of the tetracarboxylic acid dianhydride (PMDA), the solids content C, and the viscosity of the comparative polyamic acid solution (7).

TABLE 1

|  | TETRACARBOXYLIC ACID DIANHYDRIDE | FORM OF ADDITION | DIS. TIME (MIN.) | VISCOSITY (Pa · s/23° C.) | SOLIDS CONTENT (%) |
|---|---|---|---|---|---|
| EX. 1 | TMHQ | SLURRY | 9 | 310 | 20 |
| EX. 2 | TMHQ | SLURRY | 8 | 305 | 15 |
| EX. 3 | TMHQ | SLURRY | 10 | 310 | 18.5 |
| EX. 4 | TMHQ | SLURRY | 12 | 305 | 25 |
| EX. 5 | TMHQ.PMDA | SLURRY | 10 | 308 | 18.5 |
| EX. 6 | TMHQ.PMDA | SLURRY | 15 | 302 | 28.5 |
| EX. 7 | BPDA | SLURRY | 12 | 315 | 20 |
| EX. 8 | BPDA | SLURRY | 15 | 309 | 15 |
| EX. 9 | BPDA | SLURRY | 13 | 309 | 18.5 |
| EX. 10 | BPDA | SLURRY | 15 | 306 | 25 |
| EX. 11 | BDPDA | SLURRY | 12 | 295 | 20 |
| EX. 12 | BDPDA | SLURRY | 10 | 320 | 15 |
| COM. EX. 1 | TMHQ | POWDER | 92 | 100 | 20 |
| COM. EX. 2 | TMHQ | POWDER | 80 | 158 | 15 |
| COM. EX. 3 | BPDA | POWDER | 110 | 120 | 20 |
| COM. EX. 4 | BPDA | POWDER | 100 | 155 | 15 |
| COM. EX. 5 | BDPDA | POWDER | 75 | 120 | 20 |
| COM. EX. 6 | BDPDA | POWDER | 90 | 80 | 15 |
| EX. 13 | PMDA | SLURRY | 20 | 301 | 18.5 |
| COM. EX. 7 | PMDA | POWDER | 20 | 304 | 18.5 |

As is clear from Table 1, a manufacturing method according to the present invention quickly dissolve tetracarboxylic acid dianhydride and thereby improves production efficiency of polyamic acid. In contrast, the method using a powder takes time to dissolve tetracarboxylic acid dianhydride and production efficiency of polyamic acid is poor.

Further, as the results of Example 13 and Comparative Example 7 clearly indicate, the advantage of using a tetracarboxylic acid dianhydride slurry cannot be expected when the solubility index Ns of tetracarboxylic acid dianhydride exceeds 5. It is therefore preferable that tetracarboxylic acid dianhydrides used as a slurry in the present invention have a solubility index Ns of not more than 5.

EXAMPLE 14

A polyamic acid solution (14) was obtained as in Example 2 except that the TMHQ slurry was added in a longer time with an addition rate index M of 0.1. Table 2 shows the dissolution time of the tetracarboxylic acid dianhydride (TMHQ), the solids content C, and the viscosity of the polyamic acid solution (14).

EXAMPLE 15

A polyamic acid solution (15) was obtained as in Example 2 except that the TMHQ slurry was added in a shorter time with an addition rate index M of 4. Table 2 shows the dissolution time of the tetracarboxylic acid dianhydride (TMHQ), the solids content C, and the viscosity of the polyamic acid solution (15).

EXAMPLE 16

A polyamic acid solution (16) was obtained as in Example 2 except that the TMHQ slurry was added in a shorter time with an addition rate index M of 1.5. Table 2 shows the dissolution time of the tetracarboxylic acid dianhydride (TMHQ), the solids content C, and the viscosity of the polyamic acid solution (16).

Note that, for comparison, Table 2 also shows the dissolution time of the tetracarboxylic acid dianhydride (TMHQ), the solids content C, and the viscosity of the polyamic acid solution (2) of Example 2, along with its addition rate index M of 0.68 (the same as Example 1).

TABLE 2

| | TETRACARBOXYLIC ACID DIANHYDRIDE | FORM OF ADDITION | ADDITION RATE INDEX M | DISSOLUTION TIME (MIN.) | VISCOSITY (Pa · s/23° C.) | SOLIDS CONTENT (%) |
|---|---|---|---|---|---|---|
| EX. 2 | TMHQ | SLURRY | 0.68 | 8 | 305 | 15 |
| EX. 14 | TMHQ | SLURRY | 0.1 | 9 | 350 | 15 |
| EX. 15 | TMHQ | SLURRY | 4 | 10 | 90 | 15 |
| EX. 16 | TMHQ | SLURRY | 1.5 | 8 | 180 | 15 |

As is clear from Table 2, polyamic acid solutions with high viscosities can be obtained when the addition rate index M is not more than 1. It is therefore more preferable in the present invention that the tetracarboxylic acid dianhydride is added at such a rate that the addition rate index is not more than 1.

As described above, a manufacturing method of polyamic acid of the present invention includes the step of polymerizing polyamic acid by mixing a tetracarboxylic acid dianhydride and diamine, and polycondensating the tetracarboxylic acid dianhydride and diamine under a presence of a polymerization-use solvent, wherein the tetracarboxylic acid dianhydride is mixed as a tetracarboxylic acid dianhydride slurry prepared by dispersing the tetracarboxylic acid dianhydride in a dispersion medium.

In other words, a manufacturing method of polyamic acid of the present invention includes the steps of preparing a tetracarboxylic acid dianhydride slurry by dispersing a tetracarboxylic acid dianhydride in a dispersion medium; and polymerizing polyamic acid by mixing the tetracarboxylic acid dianhydride slurry and diamine, and polycondensating the tetracarboxylic acid dianhydride and diamine under a presence of a polymerization-use solvent.

Therefore, according to the manufacturing method, even if the tetracarboxylic acid dianhydride has low solubility in the polymerization-use solvent, it is possible to directly and effectively produce a polyamic acid solution having a high solids content, by a simple process and in a short time. Further, this method causes almost no "uneven polymerization" in polymerizing polyamic acid, thus stabilizing the viscosity of the resultant polyamic acid solution. Thus, it is possible to manufacture polyamic acid of high quality without increase in cost.

A polyamic acid solution of the present invention contains polyamic acid manufactured by the manufacturing method of polyamic acid, and especially, a polyamic solution of the present invention contains polyamic acid of 10% by weight or more, the polyamide being directly manufactured by the manufacturing method.

With the above arrangement, it is possible to manufacture a high-quality polyamic acid solution having high concentration with high efficiency. Thus, by using the polyamic acid solution, it is possible to produce polyimide of high quality at low cost without increase in cost.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A manufacturing method of a polyamic acid solution, comprising the step of:

polymerizing a polyamic acid solution by mixing a tetracarboxylic acid dianhydride and diamine, and polycondensating the tetracarboxylic acid dianhydride and diamine under a presence of a polymerization-use solvent, wherein the tetracarboxylic acid dianhydride is mixed as a tetracarboxylic acid dianhydride slurry prepared by dispersing the tetracarboxylic acid dianhydride in a dispersion medium.

2. The manufacturing method of claim 1, wherein:

diamine is in a form of a diamine solution in which diamine is dissolved in the polymerization-use solvent.

3. The manufacturing method of claim 1, wherein:

diamine is in a form of powder.

4. The manufacturing method of claim 1, wherein:

the dispersion medium is a solvent applicable as the polymerization-use solvent.

5. The manufacturing method of claim 1, wherein:

the tetracarboxylic acid dianhydride has a solubility index Ns of 5 or less when the slurry has a temperature of 25° C., the solubility index Ns being specified by an equation:

$$Ns=Wa/(Wa+Ws)\times 100,$$

where Wa is saturated dissolution weight of the tetracarboxylic acid dianhydride in the dispersion medium, and Ws is weight of the dispersion medium.

6. A polyamic acid solution containing polyamic acid manufactured by a manufacturing method comprising the step of:

polymerizing a polyamic acid solution by mixing a tetracarboxylic acid dianhydride and diamine, and polycondensating the tetracarboxylic acid dianhydride and diamine under a presence of a polymerization-use solvent, wherein the tetracarboxylic acid dianhydride is mixed as a tetracarboxylic acid dianhydride slurry prepared by dispersing the tetracarboxylic acid dianhydride in a dispersion medium.

7. The polyamic acid solution as set forth in claim 6, wherein:
diamine is in a form of a diamine solution in which diamine is dissolved in the polymerization-use solvent.

8. The polyamic acid solution asset forth in claim 6, wherein: diamine is in a form of powder.

9. The polyamic acid solution as set forth in claim 6, wherein:
the dispersion medium is a solvent applicable as the polymerization-use solvent.

10. The polyamic acid solution as set forth in claim 6, wherein:
the tetracarboxylic acid dianhydride has a solubility index Ns of 5 or less when the slurry has a temperature of 25° C., the solubility index Ns being specified by an equation:

$$Ns=Wa/(Wa+Ws)\times 100,$$

Where Wa is saturated dissolution weight of the tetracarboxylic acid dianhydride in the dispersion medium, and Ws is weight of the dispersion medium.

11. A polyamic acid solution containing polyamic acid of 10% by weight or more, the polyamide being directly manufactured by a manufacturing method comprising the step of:
polymerizing a polyamic acid solution by mixing a tetracarboxylic acid dianhydride and diamine, and polycondensating the tetracarboxylic acid dianhydride and diamine under a presence of a polymerization-use solvent,
wherein the tetracarboxylic acid dianhydride is mixed as a tetracarboxylic acid dianhydride slurry prepared by dispersing the tetracarboxylic acid dianhydride in a dispersion medium.

12. The polyamic acid solution as set forth in claim 11, wherein: diamine is in a form of a diamine solution in which diamine is dissolved in the polymerization-use solvent.

13. The polyamic acid solution as set forth in claim 11, wherein: diamine is in a form of powder.

14. The polyamic acid solution as set forth in claim 11, wherein: the dispersion medium is a solvent applicable as the polymerization-use solvent.

15. The polyamic acid solution as set forth in claim 11, wherein:
the tetracarboxylic acid dianhydride has a solubility index Ns of 5 or less when the slurry has a temperature of 25° C., the solubility index Ns being specified by an equation:

$$Ns=Wa/(Wa+Ws)\times 100,$$

where Wa is saturated dissolution weight of the tetracarboxylic acid dianhydride in the dispersion medium, and Ws is weight of the dispersion medium.

16. A manufacturing method of a polyamic acid solution, comprising the step of:
polymerizing a polyamic acid solution by mixing a tetracarboxylic acid dianhydride and diamine, and polycondensating the tetracarboxylic acid dianhydride and diamine under a presence of a polymerization-use solvent,
wherein:
the tetracarboxylic acid dianhydride is mixed as a tetracarboxylic acid dianhydride slurry prepared by dispersing the tetracarboxylic acid dianhydride in a dispersion medium, and
the polycondensating is carried out at a temperature of 60° C. or less.

17. A polyamic acid solution, manufactured by a manufacturing method comprising the step of:
polymerizing a polyamic acid solution by mixing a tetracarboxylic acid dianhydride and diamine, and polycondensating the tetracarboxylic acid dianhydride and diamine under a presence of polymerization-use solvent,
wherein the tetracarboxylic acid dianhydride is mixed as a tetracarboxylic acid dianhydrde slurry prepared by dispersing the tetracarboxylic acid dianhydride in a dispersion medium, and the polycondensating is carried out at a temperature of 60° C. or less.

* * * * *

UNITED STATES PATENT AND TRADEMARK OFFICE
CERTIFICATE OF CORRECTION

PATENT NO. : 6,852,826 B2
DATED : February 8, 2005
INVENTOR(S) : Fujihara et al.

It is certified that error appears in the above-identified patent and that said Letters Patent is hereby corrected as shown below:

<u>Title page,</u>
Item [73], Assignee, change "Kanera" to -- Kaneka --.

Signed and Sealed this

Sixth Day of September, 2005

JON W. DUDAS
*Director of the United States Patent and Trademark Office*